United States Patent
Hart et al.

(10) Patent No.: US 11,341,787 B2
(45) Date of Patent: May 24, 2022

(54) DEVICE MANAGEMENT

(71) Applicant: BRITISH TELECOMMUNICATIONS PUBLIC LIMITED COMPANY, London (GB)

(72) Inventors: Jonathan Hart, London (GB); Ruth Brown, London (GB); Maria Cuevas Ramirez, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 17/440,751

(22) PCT Filed: Feb. 21, 2020

(86) PCT No.: PCT/EP2020/054702
§ 371 (c)(1),
(2) Date: Sep. 17, 2021

(87) PCT Pub. No.: WO2020/187528
PCT Pub. Date: Sep. 24, 2020

(65) Prior Publication Data
US 2022/0092886 A1    Mar. 24, 2022

(30) Foreign Application Priority Data
Mar. 20, 2019 (EP) .................................... 19164017

(51) Int. Cl.
*G07C 5/00* (2006.01)
*H04W 4/40* (2018.01)
(Continued)

(52) U.S. Cl.
CPC ............ *G07C 5/008* (2013.01); *G07C 5/0841* (2013.01); *G08B 25/10* (2013.01); *H04W 4/029* (2018.02); *H04W 4/40* (2018.02); *H04W 4/90* (2018.02)

(58) Field of Classification Search
CPC ........ G07C 5/008; G07C 5/0841; G07C 5/00; G08B 25/10; H04W 4/029; H04W 4/40;
(Continued)

(56) References Cited

U.S. PATENT DOCUMENTS 9,354,296 B2    5/2016    Ubhi et al.
9,514,653 B2    12/2016    Cheatham, III et al.
(Continued)

FOREIGN PATENT DOCUMENTS

GB    2553668    3/2018
WO    2014/080387    5/2014
(Continued)

OTHER PUBLICATIONS

International Search Report and Written Opinion of the ISA for PCT/EP2020/054701 dated May 26, 2020, 12 pages.
(Continued)

*Primary Examiner* — Yonel Beaulieu
(74) *Attorney, Agent, or Firm* — Nixon & Vanderhye P.C.

(57) ABSTRACT

A method of operating a device, the device being configured to communicate with a wireless telecommunications network and the device being in the form of an Autonomous Vehicle (AV), the method comprising the steps of: detecting a fault associated with the AV; and in response to detecting said fault, causing the AV to transmit a mayday wireless network communication for alerting the wireless telecommunications network of the fault; in response to the mayday wireless network communication, identifying a recovery AV that is capable of retrieving at least part of the AV and
(Continued)

delivering said at least part to an intended destination; and instructing the recovery AV to perform the retrieving and delivering by communicating an instructing message, wherein the instructing message is in the form of a system information message.

16 Claims, 5 Drawing Sheets

(51) Int. Cl.
*H04W 4/90* (2018.01)
*G08B 25/10* (2006.01)
*G07C 5/08* (2006.01)
*B64C 39/02* (2006.01)
*H04W 4/029* (2018.01)

(58) Field of Classification Search
CPC .......... H04W 4/90; H04W 4/00; B64C 39/02; B64C 39/024
See application file for complete search history.

(56) References Cited

U.S. PATENT DOCUMENTS

| | | | |
|---|---|---|---|
| 9,524,648 B1 | 12/2016 | Gopalakrishnan et al. | |
| 9,875,965 B2 | 1/2018 | Fu et al. | |
| 10,310,498 B2* | 6/2019 | Petruzzelli | G08G 5/0021 |
| 2010/0042269 A1* | 2/2010 | Kokkeby | G05D 1/0094 701/3 |
| 2010/0305857 A1* | 12/2010 | Byrne | G06T 7/73 382/107 |
| 2015/0239436 A1 | 8/2015 | Kanai et al. | |
| 2016/0297521 A1 | 10/2016 | Cheatham, III et al. | |
| 2017/0061290 A1* | 3/2017 | Harlow | G06N 5/022 |
| 2017/0253345 A1 | 9/2017 | Katz | |
| 2017/0369167 A1* | 12/2017 | Meadow | G05D 1/0038 |
| 2018/0040171 A1 | 2/2018 | Kundu et al. | |
| 2018/0157255 A1 | 6/2018 | Halverson et al. | |
| 2018/0196437 A1 | 7/2018 | Herbach et al. | |
| 2018/0276993 A1 | 9/2018 | Chow et al. | |
| 2018/0294871 A1 | 10/2018 | Kosseifi et al. | |
| 2018/0300834 A1 | 10/2018 | High et al. | |
| 2018/0373268 A1* | 12/2018 | Antunes Marques Esteves | B60L 58/12 |
| 2019/0020404 A1* | 1/2019 | Russell | G01S 19/11 |
| 2019/0025858 A1* | 1/2019 | Bar-Nahum | G05D 1/0094 |
| 2020/0252851 A1* | 8/2020 | Tukmanov | H04W 36/32 |
| 2020/0346781 A1* | 11/2020 | Bosma | B67D 7/04 |
| 2021/0096255 A1* | 4/2021 | Turov | G06V 20/64 |
| 2021/0097664 A1* | 4/2021 | Turov | G06T 7/248 |
| 2022/0036741 A1* | 2/2022 | Ozturk | G06K 9/6293 |

FOREIGN PATENT DOCUMENTS

| | | |
|---|---|---|
| WO | 2018/108262 | 6/2018 |
| WO | 2019/055183 | 3/2019 |

OTHER PUBLICATIONS

Extended Search Report for EP19161722.4 dated Jun. 7, 2019, 8 pages.
Extended Search Report for EP19164017.6 dated Nov. 19, 2019, 6 pages.
Examination Report for GB1903783.7 dated Jul. 19, 2021, 3 pages.
Combined Search and Examination Report for GB 1903159.0 dated Sep. 9, 2019, 8 pages.
Combined Search and Examination Report for GB 1903783.7 dated Sep. 23, 2019, 6 pages.
International Preliminary Report on Patentability for PCT/EP2020/054702 dated Aug. 18, 2020, 7 pages.
International Search Report and Written Opinion of the ISA for PCT/EP2020/054702 dated Apr. 24, 2020, 11 pages.
Pre-filing Search Report (A33761), Novelty Search Report, Topic—A33761—Drone Relaying, dated Oct. 19, 2018, 36 pages.

* cited by examiner

DEVICE MANAGEMENT

This application is the U.S. national phase of International Application No. PCT/EP2020/054702 filed 21 Feb. 2020, which designated the U.S. and claims priority to 19164017.6 filed 20 Mar. 2019, the entire contents of each of which are hereby incorporated by reference.

FIELD OF INVENTION

The present invention relates to a method of managing an Autonomous Vehicle (AV), a system therefor and to an AV.

BACKGROUND

Autonomous Vehicles (AVs), such as autonomous cars or drones, may be used for logistics. In particular, such AVs may be used to deliver packages from a distribution centre to a delivery address.

In many cases, AVs source electrical power for propulsion from an internal battery. Such AVs therefore have a limited range due to limited battery supply, typically providing less than an hour's worth of travel (and in many cases only 20-30 minutes). This significantly limits the logistical uses of such AVs. In an effort to counter this limitation, AVs may be made to be lightweight, which in turn may render them fragile and therefore prone to mechanical failures.

An AV may be provided with a cellular network interface so as to communicate with a control centre, for example to update the control centre as to the status of the AV, and in particular if a fault has arisen in the AV. The control centre may then take remedial action, such as instructing the AV to take a particular action. However, such cellular network communication between an AV and a control centre may consume significant amounts of power from the battery of an AV (which may not even be possible if an AV has insufficient remaining battery power), and/or require significant networking resources.

In view of the above, it is an aim of the present invention at least to alleviate some of the aforementioned problems.

STATEMENTS OF INVENTION

According to a first aspect of the present invention, there is provided: a method of operating a device, the device being configured to communicate with a wireless telecommunications network and the device being in the form of an Autonomous Vehicle (AV), the method comprising the steps of: detecting a fault associated with the AV; and in response to detecting said fault, causing the AV to transmit a mayday wireless network communication for alerting the wireless telecommunications network of the fault, wherein the mayday wireless network communication is in the form of a system information message.

According to another aspect of the invention, there is provided: a method of operating a device, the device being configured to communicate with a wireless telecommunications network, the method comprising the steps of: detecting a fault associated with the device; and in response to detecting said fault, causing the device to transmit a mayday wireless network communication for alerting the wireless telecommunications network of the fault, wherein the mayday wireless network communication is in the form of a system information message.

According to yet another aspect of the invention, there is provided: a method of operating a device, the device being in the form of an AV and configured to communicate with a wireless telecommunications network, the method comprising the steps of: detecting a fault associated with the device; and in response to detecting said fault, causing the AV to transmit a mayday wireless network communication for alerting the wireless telecommunications network of the fault; in response to said mayday wireless network communication, identifying a recovery AV that is capable of retrieving at least part of the device and delivering said at least part to an intended destination; and instructing the recovery AV to perform the retrieving and delivering by communicating an instructing message, wherein the instructing message is in the form of a system information message.

Preferably, the system information message/s (preferably, including, at least, the instructing message) is communicated (or broadcast) by the, or another, wireless telecommunications network, and in particular by a radio access point. Preferably, the system information message/s (preferably, including, at least, the instructing message) is communicated by a wireless telecommunications network to which the recovery AV is not subscribed (or "registered") and/or with which a home wireless telecommunications network of the recovery AV does not have in place a roaming agreement with the, or the other, wireless telecommunications network, and such that the recovery AV is therefore incapable of accessing (i.e. so as to facilitate network communication) the wireless telecommunications network.

Optionally, the device is a vehicle (including a human-operated vehicle) or a wearable device.

Preferably, as used herein, a "fault" in the context of an AV is any existing and/or anticipated condition that prevents and/or that may prevent the AV from operating and/or from operating as intended (e.g. safely and/or efficiently); in particular, this includes mechanical, electrical and computational faults, as well as environmental conditions (e.g. weather).

Preferably, as used herein, the term "system information message" includes any communication between User Equipment (UE)—such as an AV—and a Radio Access Network (RAN) of the wireless telecommunications network for configuring (but not necessarily establishing) ongoing communication between the two, and in particular at a physical layer of the network. The system information message may be an overhead communication.

Preferably, the system information message is capable of being received and processed (e.g. so as to be intelligible as an alert regarding the fault) by the wireless telecommunications network without the UE having registered, being able to register and/or established a network data session, with the wireless telecommunications network.

The system information message may include a Master Information Block (MIB) and/or a System Information Block (SIB) message, for example as described in 3GPP Technical Specification 36.331, version 15.4.0, section 5.2. Said System Information Block (SIB) may be in the form of any of a Type 1 to 13 SIB, and preferably it is in the form of a Type 1 SIB.

Optionally, the wireless telecommunications network is a cellular network or a satellite-enabled wireless telecommunications network. Optionally, the wireless telecommunications network is a 2G, 3G, 4G or 5G telecommunications network.

Optionally, the AV detects the fault. The AV and/or the wireless telecommunications network may identify the fault.

Optionally, the intended destination is a destination for delivery as originally intended by the AV or a destination as intended by the recovery AV, which may be different to the destination for delivery as originally intended by the AV.

Optionally, the step of identifying the recovery AV is performed by the wireless telecommunications network (e.g. by a core of the wireless telecommunications network), by the recovery AV or by the AV.

Optionally, the step of instructing the recovery AV is performed by means of a wireless network communication, and said wireless network communication may be in the form of a system information message.

Optionally, the step of identifying the recovery AV and/or the step of instructing the recovery AV is performed by a controller that is remote to the AV and/or the recovery AV, and controller may be part of the wireless telecommunications network, and in particular part of a core of the wireless telecommunications network.

Optionally, the AV comprises a payload, wherein the AV is instructed to deliver the payload to an intended destination. Optionally, the at least part of the AV is: the payload of the AV; the AV, with or without the payload; and/or part of the AV, with or without the payload. Optionally, the part of the AV excluding the payload, is debris. Optionally, the AV comprises means for transporting the payload, which may be in the form of a cargo bay or a structure for carrying the payload. Where the at least part of the AV includes the, or part of the, AV with a payload, the recovery AV may deliver the payload to a different location to the, or the part of the, AV (which may be delivered for repair or disposal).

Optionally, the recovery AV is a recovery vehicle capable of retrieving at least part of the device and/or a user of the device.

Preferably, the method further comprises the step of identifying the recovery AV in dependence on an identified location of the recovery AV and/or the AV.

Preferably, the method further comprises the step of communicating the instructing message by means of at least one radio access point, and wherein said at least one radio access point is selected in dependence on the identified location of the recovery AV.

Optionally, the method further comprises the step of identifying the location of the AV by means of the system information message.

The location of the AV may be derived from a triangulation (or other geometric) method associated with the receipt of the system information message by the wireless telecommunications network.

Optionally, the system information message comprises an explicit location of the AV, said location having been determined by the AV, for example by means of a Global Positioning System (GPS).

Optionally, the system information message comprises a future intended rendezvous destination (which is not the intended destination of the AV) of the AV, and wherein the AV is configured to travel to said destination.

Preferably, the method further comprises the steps of the wireless telecommunications network: having received the mayday wireless communication; and in response to the mayday wireless communication, transmitting a recovery wireless network communication for causing the recovery AV to respond to said recovery wireless network communication with capability information regarding a capability of the recovery AV to retrieve the at least part of the AV and to deliver said at least part to the intended destination, and identifying the recovery AV in dependence on said capability information.

Preferably, the recovery wireless network communication is transmitted prior to having identified the recovery AV.

Optionally, said recovery wireless network communication and/or the response from the recovery AV is a system information message.

Preferably, said recovery wireless network communication is communicated by a radio access point of the wireless telecommunications network that received the mayday wireless network communication, or preferably by another radio access point of another wireless telecommunications network to which the recovery AV is not a subscriber.

Optionally, the mayday wireless network communication, the instructing message and/or the recovery wireless network communication comprises: a flag to indicate a fault; a unique identifier of the AV; a geographic location of the AV; a time and/or date stamp; information regarding the AV; information regarding the fault; information regarding a payload being carried, if any, by the AV, including an intended delivery destination of the payload.

Optionally, said recovery wireless network communication and/or instructing message is/are transmitted by a RAN access point that first received the mayday wireless network communication and/or that is closest to the AV.

Optionally, said recovery wireless communication is communicated by at least one RAN access point that is adjacent to the RAN access point that first received the mayday wireless network communication and/or the RAN access point that is closest to the AV.

Optionally, communication of the recovery wireless communication is triggered by an Access and mobility Management Function (AMF) of the core of the wireless telecommunications network, and optionally by instructing a RAN access point by means of a secure representational State Transfer (REST) interface.

Optionally any of the aforementioned system information messages are available to comprise: information regarding at least part of the AV, including weight, dimensions, intended destination (e.g. an intended recipient and/or location for delivery); whether the at least part (and in particular, payload) is fragile; a delivery priority level; specific handling instructions; and/or an intended handling orientation.

Preferably, the fault is detected in response to receiving a network communication for reporting a fault; said network communication may be in the form of a system information message. Optionally, the fault is reported to the AV, so that the AV may detect said fault. Optionally, the network communication for reporting a fault is in the form of a system information message. Optionally, the network communication for reporting a fault is an alert as to an adverse environmental condition, which may include an adverse weather condition.

Preferably, the mayday wireless network communication comprises information regarding the at least part of the AV that is to be retrieved and delivered. Optionally, a subsequent wireless network communication from the AV comprises information regarding the at least part of the AV that is to be retrieved and delivered.

Preferably, the AV ceases travel in response to detecting the fault.

Preferably, the AV is carrying one or more payload/s to one or more intended destination/s, and wherein a plurality of recovery AVs are identified and instructed to retrieve and to deliver the one or more payload/s to the one or more intended destination/s. Optionally, the plurality of payloads are collected by the plurality of recovery AVs in a sequence according to a priority assigned to each payload.

Preferably, the AV and/or the recovery AV is unmanned. Optionally, the AV is carrying a passenger.

Preferably, the AV and/or the recovery AV is an aerial, marine and/or ground vehicle.

Preferably, at least a part of the system information message (mayday message) is encrypted. Optionally, at least a part of each system information message is encrypted or configured to conceal the existence of the mayday message to unauthorised devices.

Preferably, the (and/or each) system information message is encrypted and/or configured to conceal: the location of the AV (including a future intended rendezvous destination); the nature of the fault of the AV, if known; the intended destination of the payload; and/or information associated with the payload.

According to yet another part of the invention, there is provided an Autonomous Vehicle (AV) comprising: means for detecting a fault associated with the AV; a transmitter for communicating with a wireless telecommunications network; and a processor configured, in response to detecting said fault, to generate a mayday wireless network communication for alerting the wireless telecommunications network of the fault, wherein the mayday wireless network communication is in the form of a system information message, and for causing the transmitter to transmit said mayday wireless network communication to the wireless telecommunications network.

According to still another aspect of the invention, there is provided a system for managing Autonomous Vehicles (AVs), comprising: an AV as described above; and a wireless telecommunications network, comprising: a transceiver for receiving the mayday wireless network communication from the AV.

According to yet another aspect of the invention, there is provided a system for managing Autonomous Vehicles (AVs), comprising: an AV; a recovery AV; and a wireless telecommunications network, comprising: a transceiver for communicating an instructing message to the recovery AV, wherein said instructing message is configured to cause the recovery AV to perform retrieval and delivery of the, or a part of the, AV, wherein the instructing message is in the form of a system information message.

Optionally, the system further comprises: a recovery AV comprising: a receiver for receiving a wireless network communication for instructing the recovery AV to recover at least part of the AV; and means for carrying a payload so as to recover said at least part of the AV; a processor for identifying (and/or selecting) the recovery AV in response to receiving the mayday wireless network communication from the AV, and for causing the transceiver to transmit the wireless network communication for instructing the recovery AV to recover at least part of the AV; and wherein the transceiver is further configured to transmit the wireless network communication for instructing the recovery AV.

Optionally, the means for detecting the fault is a sensor and/or a telecommunications receiver.

The invention extends to any novel aspects or features described and/or illustrated herein. The invention extends to methods and/or apparatus substantially as herein described and/or as illustrated with reference to the accompanying drawings. The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

BRIEF DESCRIPTION OF THE DRAWINGS

The invention extends to a method of operating a device, to an Autonomous Vehicle and to a system for managing Autonomous Vehicles as described herein and/or substantially as illustrated with reference to the accompanying drawings. The present invention is now described, purely by way of example, with reference to the accompanying diagrammatic drawings, in which.

SPECIFIC DESCRIPTION

Figure 1:
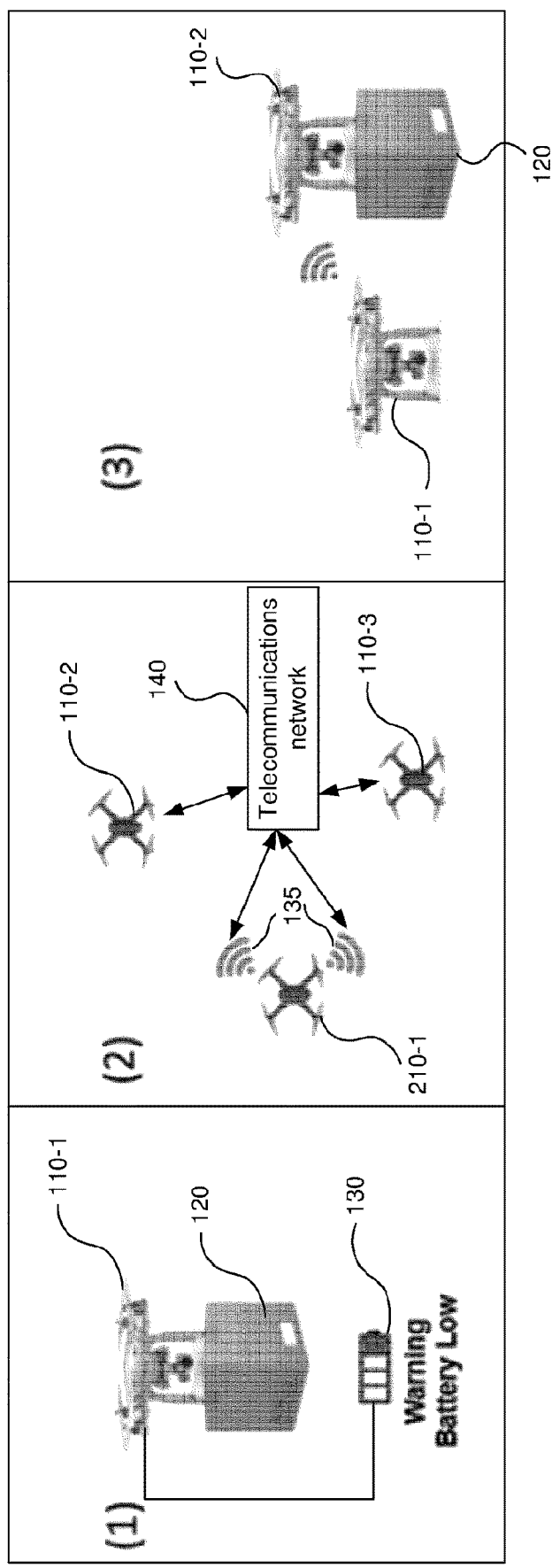
FIG. 1 shows an Autonomous Vehicle (AV) performing a recovery operation.

FIG. 1 shows a first Autonomous Vehicle (AV) 110-1, in the form of an aerial vehicle (or so-called "drone") that has been designated a task (herein referred to as a 'designated task') for it to execute. In the example of FIG. 1, the designated task of the first AV is delivery of a payload 120 to an intended destination.

Figure 2:
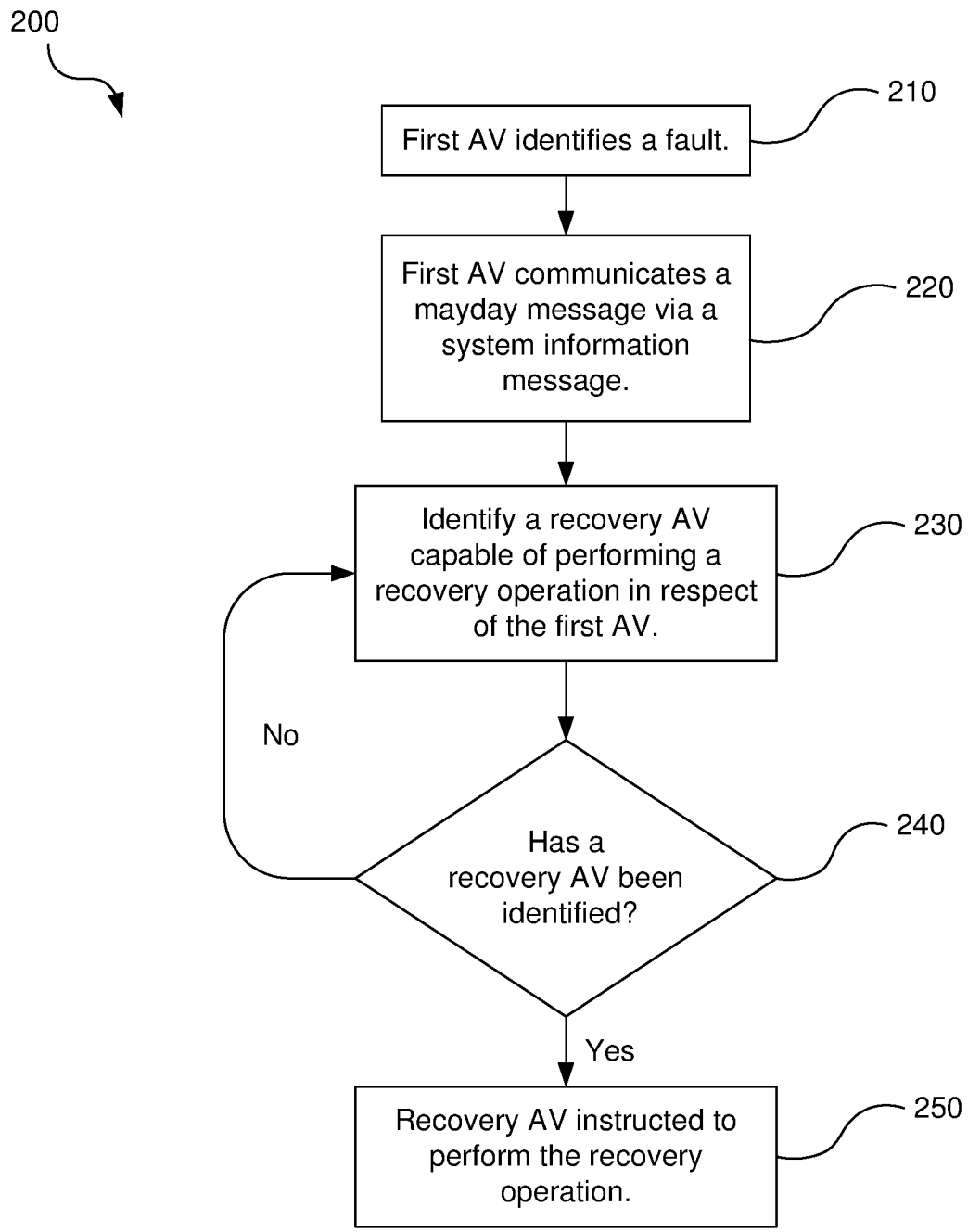
FIG. 2 shows an overview of a process for executing the recovery operation by an AV.

FIGS. 1 and 2 show, in general, a process 200 of managing the first AV 110-1, and in particular of performing an operation to recover the payload 120 from the first AV by means of another AV 110 and then to complete the designated task (herein referred to as a 'recovery operation').

As best shown in FIG. 2, in a first step 210, the first AV 110-1 identifies a fault affecting its ability to perform its designated task, or to do so safely and/or efficiently, in which case the first AV is designated as a 'faulty AV'.

As shown in FIG. 1, the first AV comprises a battery 130 for powering its movement, and in this example, and in accordance with step 210, the first AV detects (and identifies) a fault owing to insufficient battery power.

In response to detecting the fault 210, the first AV 110-1 transmits 220 (by means of a transmitter, not shown) a wireless network communication 135 (herein referred to as a 'mayday message' or a 'mayday wireless network communication') to a wireless telecommunications network 140. The mayday message 135 is configured to alert the wireless telecommunications network 140 that the first AV has a fault (and therefore that it is a faulty AV). The mayday message is in the form of a system information message or a message via cellular telecommunications data session.

Figure 3:
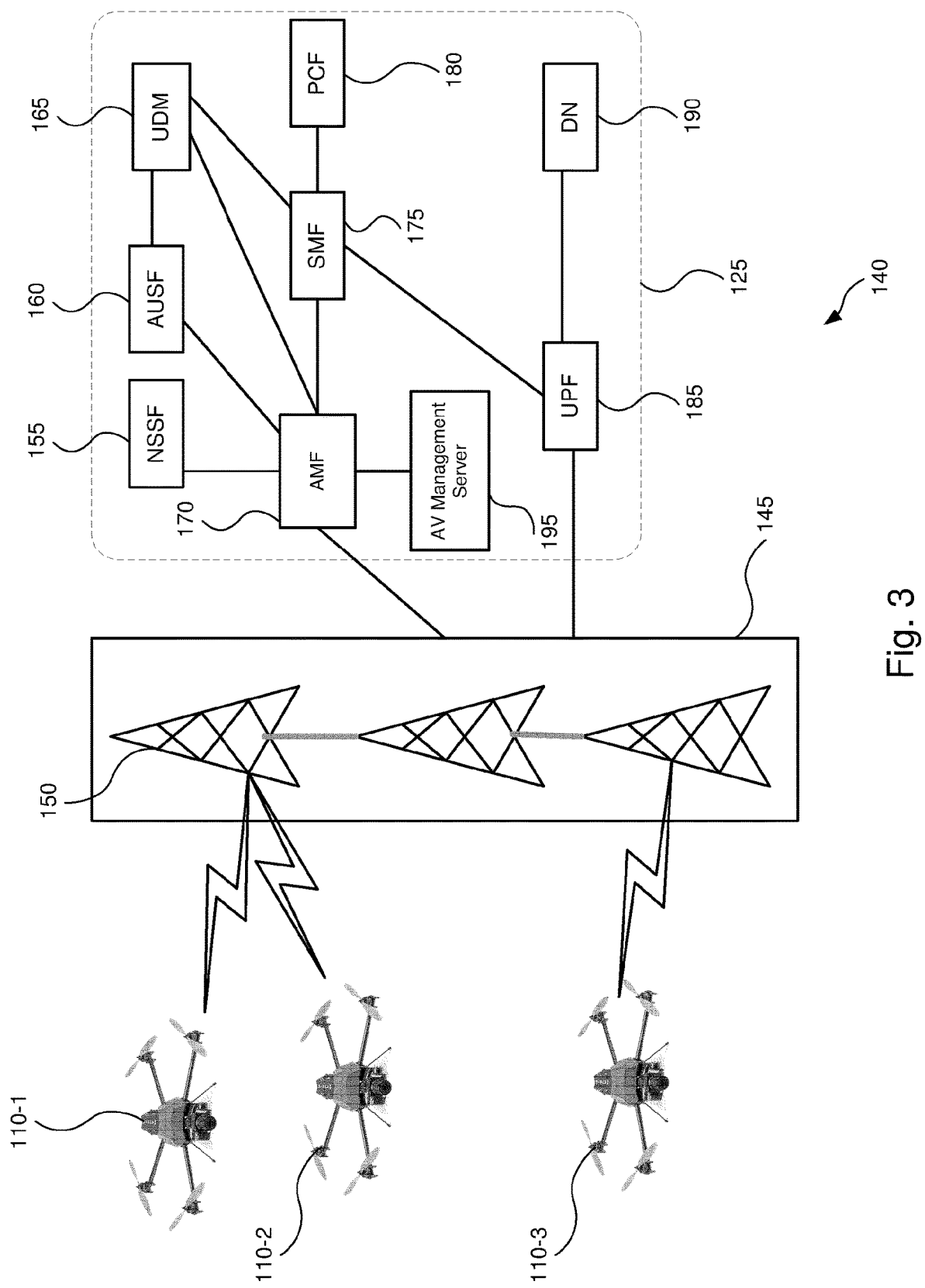
FIG. 3 is a schematic diagram of a telecommunications network for facilitating the recovery operation.

FIG. 3 shows in more detail the wireless telecommunications network 140 with which AVs may communicate.

The wireless telecommunications network 140 is shown as a mobile cellular network that includes a Radio Access Network (RAN) 145, as provided by RAN access points 150 (e.g. in the form of macro-, micro-, pico- or femto-cell sites). In turn, the RAN access points 150 are connected to a core network 125. Each AV 110 may or may not be configured to access the wireless telecommunications network via the RAN 145.

The wireless telecommunications network 140 operates in accordance with, for example, 5G technology. Accordingly, in this example, the core network 125 comprises the following functional components:

Network Slice Selection Function (NSSF) 155;
AUthentication Server Function (AUSF) 160;
Unified Data Management (UDM) 165;
Access and mobility Management Function (AMF) 170;
Session Management Function (SMF) 175
Policy Control function (PCF) 180;
User Plane Function (UPF) 185; and
Data Network (DN) 190.

The core network 125 also comprises an AV Management Server (AVMS) 195, which is in communication with the AMF 170.

Accordingly, process 200 continues such that the wireless telecommunications network 140 receives the mayday message and forwards the message (e.g. via the AMF 170) to the AVMS 195 so as to determine if there is at least one AV (other than the faulty AV from which the mayday message originated) that is capable of performing the recovery operation in respect of the payload 120 at step 230.

In this example, the recovery operation includes retrieving the payload 120 and continuing the delivery of the payload to its intended destination (i.e. completing the designated task of the first AV 110-1).

If, at steps 230 and 240, an AV is identified as being capable of performing the recovery operation (herein referred to as the 'recovery AV'), the identified recovery AV is instructed to perform the recovery operation 250.

In more detail, the RAN 145 forwards the mayday message 135 to the AMF 170, which in turn forwards the mayday message on to the AVMS 195 so as to perform processing so as to identify a recovery AV, as per step 230 of FIG. 2.

The AVMS 195 comprises a database storing information regarding AVs that are available to act as a recovery AV (also referred to as 'candidate recovery AVs'), along with a processor for assessing the suitability of each candidate recovery AV to act as a recovery AV for a given recovery operation.

The database of the AVMS 195 comprises information regarding the capabilities of the candidate recovery AV.

The database of the AVMS is populated by:
receiving updates from candidate recovery AVs regarding their capabilities, in which updates are issued:
as wireless network communications (for example, in the form of a system information message or a message via a cellular telecommunications data session);
at regular intervals (e.g. every hour); and/or
upon a change in capabilities (e.g. when a candidate recovery AV is designated a task and so may no longer have the capability to perform a recovery operation); and/or
the AVMS 190 triggering, in response to receiving the mayday message, the telecommunications network 140 to transmit an interrogation wireless network communication (for example, in the form of a system information message or a message via a cellular telecommunications data session) that causes a candidate recovery AV to report capability information back to the telecommunications network;
in this way the AVMS data is updated on demand, rather than on an ongoing basis, which may help, not least, conserve battery life of candidate recovery AVs; and
in one example, the interrogation wireless network communication is transmitted from a RAN access point 150 at which the mayday message was first received and/or nearest to the first AV that issued the mayday message and/or by an adjacent RAN access point.

In one example the recovery AV is instructed to travel to retrieve the payload from a current location of the first AV. In another example, the recovery AV is instructed to retrieve the payload from the first AV at a future intended destination (also referred to as a 'rendezvous location').

The current location of the first AV is available to be derived from information associated with when and where the mayday message 135 was received by the RAN (for example, by means of RAN access point triangulation) and/or to be explicitly stated within the mayday message, for example based on a GPS reading from the first AV.

If, however, at steps 230 and 240, no recovery AV is identified by the AVMS 195 as being capable of performing the recovery operation, then the AVMS 195 repeats step 230 after a predetermined period of time (in case new candidate recovery AVs are available at this later point in time).

In the example shown in and described with reference to FIG. 1, the second 110-2 and third AVs 110-3 are candidate recovery AVs, and the AVMS 195 identifies the second AV 110-2 as the recovery AV. Accordingly, the second AV 110-2 is therefore instructed to perform the recovery operation so as to recover the payload 120 from the first AV 110-1 and to continue delivery of the payload to its intended destination.

Faults that may be detected by the first AV include mechanical and electrical faults, such as damage to a motor or rotor blade, low battery power and software faults. Furthermore, adverse environmental conditions are also available to be sensed as a fault, and include, for example: adverse weather conditions (e.g. high winds, cold weather, heavy precipitation and thunder storms); obstructions (e.g. buildings, trees, terrain and other vehicles, in particular aircraft); natural disasters (e.g. fires); and malicious attempts at interference (e.g. vandalism and theft).

A fault is detected by the first AV using appropriate sensors and/or by receiving a network communication (for example, in the form of a system information message or a message via a cellular telecommunications data session) informing the AV of a fault (in particular where the fault relates to environmental conditions). Detection of a fault by the first AV is available to be performed in anticipation of a fault developing or in response to a fault having developed.

A fault associated with the first AV is capable of being detected, for example, by:
- the first AV 110-1 directly, in particular by means of an appropriate sensor, such as a battery level sensor and suitable processing functionality;
- the telecommunications network, in particular by a module of the core network 125, such as the AVMS 195 and/or the DN 190 (by means of a communication with network or entity that is remote to the telecommunications network 140) and for example:
  - the telecommunications network is configured to detect a fault in response to telematics information received from the first AV; and/or
  - identifying a fault by means of the telecommunications network centre is most appropriate (but not exclusively) for identifying an adverse environmental condition;
- a reporting AV that is not the first AV 110-1, the reporting AV itself detecting a fault and then sending a wireless network communication (such as a system information message or a message via a cellular telecommunications data session) to the telecommunications network 140, and in particular to the AVMS 195, which may subsequently identify that the fault, as reported by the reporting AV, is a wider fault (e.g. an adverse environmental condition) that may affect the first AV.
  - it will be appreciated that, whilst the reporting AV is not the (faulty) first AV 110-1, it may nonetheless be a (faulty) first AV, in the sense that the reporting AV has itself detected a fault associated with itself that renders the reporting AV the subject of a recovery operation. Alternatively, the reporting AV is also available to be the second AV 110-2 (i.e. a candidate recovery AV).

In one example, the mayday message 135 is at least a flag to indicate to the telecommunications network the existence of a fault.

The mayday message 135 is also available to include any of:
- an identifier that uniquely identifies the first AV, such as an International Mobile Equipment Identity (IMEI);
- a current geographical location of the first AV;
- a future (intended) geographic location of the first AV, for example a rendezvous location for the first AV and the recovery AV;
- details regarding the designated task, including:
  - the importance/priority of the designated task (e.g. a low-priority delivery, such as for a basic consumer good, or a high-priority delivery, such as blood for transfusion); and/or
  - details regarding the intended destination of the payload, including:
    - geographical co-ordinates, an address, and/or an identifier of a recipient; and/or
    - an intended route to be taken to the intended destination (e.g. a fastest or a most energy-efficient route);
- details regarding the nature of the fault identified by the first AV; and/or
  - this is available to be used by the AVMS 195 to help assess whether a given candidate recovery AV is suitable to perform the recovery operation, since a recovery operation may be ineffective if the identified fault may cause a fault to said given candidate recovery AV (e.g. if the fault is an intense forest fire);
- details regarding the payload, including:
  - dimensions;
  - mass;
  - orientation with which it is to be handled;
  - whether it is fragile;
  - whether it is a dangerous payload (e.g. containing toxic chemical or explosives, such as in the case of fireworks); and/or
  - where the payload is a plurality of individual items, the number of such items (as well as any of the aforementioned details as applicable to each such item) and/or the items that are to be recovered, if not all, by a given recovery operation.

It will be appreciated that the payload can comprise any form of physical object. In one example, the payload is: a package (e.g. comprising goods, waste and/or refuse); another AV; a passenger; or a combination thereof.

Since the mayday message is in the form of a system information message, it is capable of being received by, and successfully processed by, the wireless telecommunications network 140 without the first AV having registered with the wireless telecommunications network 140. Furthermore, the AV may be unable to register with a particular RAN (since the RAN may be associated with a mobile network operator with which the AV is not registered, for example where there is no roaming agreement with this mobile network operator and that of the AV, and/or where the RAN is associated with a private network), but the mayday message in the form of a system information message will still be received and processed even when the AV is unable to register with a RAN. Accordingly, the mayday message may provide battery- and signalling-efficient means of alerting the wireless telecommunications network 140 to the fault associated with the first AV (not least, since additional communications to register the first AV with the wireless telecommunications network 140 are not necessary or possible).

In one specific example, the system information message is in the form of a System Information Batch (SIB) message, and in particular in the form of a SIB Type 1 message, for example substantially as described in 3GPP Technical Specification 36.331, version 15.4.0, section 5.2, the contents of which are hereby incorporated by reference. The SIB Type 1 message is adapted so as to comprise a new field that allows that SIB Type 1 message to act as a mayday message, and for example the new field forms part of the Cell Access Related Information field of a SIB Type 1 message.

The system information message (or only a portion that performs the function of the mayday message, and/or that provides details to facilitate a recovery operation) is encrypted so as to prevent a malicious actor from being alerted to the presence of a faulty AV and then from recovering the faulty AV and/or its payload. In one example, the encrypted communication is only readable by a telecommunications network or a telecommunications device (such as an approved candidate recovery AV) that is authorised to do so, for example by having registered to participate in the service.

Figure 4:
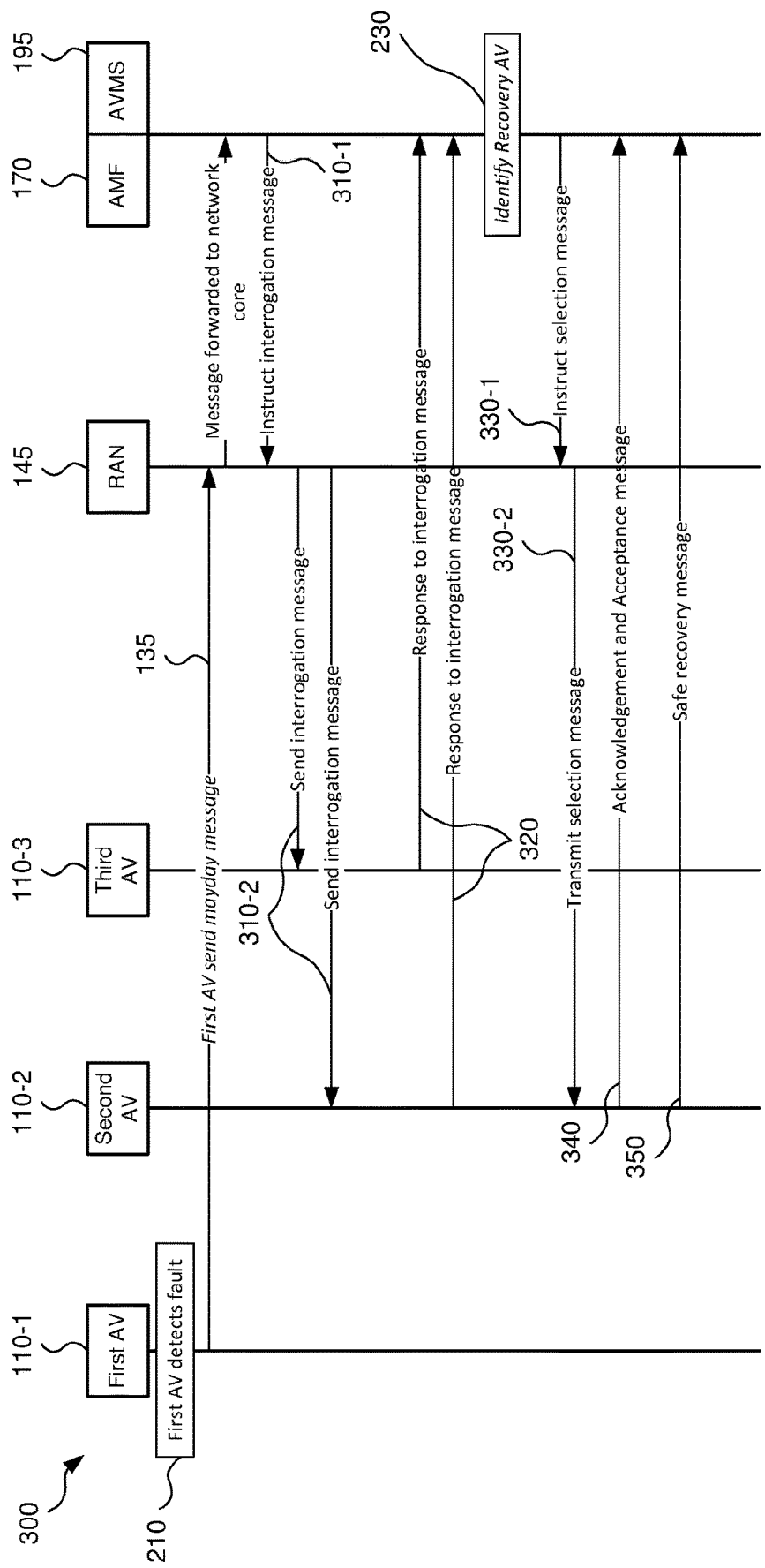
FIG. 4 is a network signalling diagram illustrating signalling amongst AVs so as to effect the recovery operation.

FIG. 4 is a signalling diagram 400 showing communications between AVs and the telecommunications network so as to facilitate process of FIG. 2.

As described above, the first AV—having detected a fault—issues a mayday message 135 in the form of a system information message or a message via a cellular telecommunications data session; this communication 135 is received by the RAN 145 and it is then forwarded on to the network core 125, and in particular to the AMF 170 and then the AVMS 195.

Accordingly, the AVMS 195 identifies (from its database) a list of candidate recovery AVs, as selected in dependence on information associated with the first AV 110-1 received from the mayday message or otherwise (such as its location and details regarding its payload). The AVMS 195 subsequently instructs the RAN 145 (via the AMF 170)—and in particular the appropriate RAN Access Point(s) 150—to transmit an interrogation message to the identified candidate recovery AVs 310-1; the RAN 145 subsequently does so 310-2, and in this example transmits the interrogation message to the second 110-2 and third 110-3 AVs (within the appropriate cell of the telecommunications network 140). In one example, the interrogation message is in the form of a system information message.

The second 110-2 and third 110-3 AVs subsequently respond to the interrogation message 320, which are received by the AVMS 195; these responses include, for example the capability information of the AVs.

The AVMS 195 (by means of its associated processor) performs a process (based on information within its database and/or information received as part of the responses to the interrogation message) identifies—as per step 230 described above—the most suitable of the candidate recovery AVs for performing the recovery operation from the AVs that responded to the interrogation message. In the example of FIG. 4, the second AV 110-2 is identified as the recovery AV.

Once a recovery AV has been identified by the AVMS 195, the AVMS instructs the RAN 145 (via the AMF 170) to transmit a selection message (or an 'instructing message') that instructs the identified recovery AV to perform the recovery operation 330-1. Accordingly, the RAN 145 subsequently transmits the selection message 330-2 (in the form of, for example, a system information message). In response, the second AV 110-2 acknowledges safe receipt of the selection message by way of an acknowledgement 340 and accepts selection as the recovery AV by way of a 'safe recovery message' 350. The acknowledgement and/or safe recovery message is/are in the form of a message over a data session with a cellular telecommunications network, as such the recovery AV connects with its home telecommunications network so as to transmit the acknowledgement and 'safe recovery message'. In one example, the second AV is available to refuse its selection as the recovery operation.

Accordingly, when the second AV accepts the recovery operation, the second AV 110-2 travels to the first AV 110-1 and recovers the payload 120, and the second AV 110-2 is configured to communicate (for example, in the form of a system information message or a message via a cellular telecommunications data session) to the telecommunications network 140 safe recovery of the payload 360 as part of a safe recovery message.

In one example, information for facilitating the recovery operation is communicated to the recovery AV either as part of the selection message 330-2, as a local area wireless communication by the first AV upon recovery of the payload or as a further wireless network communication by the telecommunications network upon recovery of the payload.

In the example of FIG. 4, if no recovery AV is identified by the AVMS 195, then as per step 250 shown in, and described with reference to, FIG. 2, the interrogation message 310-2 is re-transmitted after a predetermined period of time, and the AVMS repeats the process of identifying the recovery AV.

In one example, to help ensure successful communication, the first AV is configured repeatedly to transmit the mayday message until an acceptance message and/or safe recovery message 350 is received by the telecommunications network, following which the telecommunications network acknowledges to the first AV 110-1 the recovery AV performing the recovery operation and/or safe recovery of the payload (not shown in FIG. 4).

Identifying a recovery AV is performed in dependence on the capabilities of a candidate recovery AV to perform the recovery operation.

Figure 5:
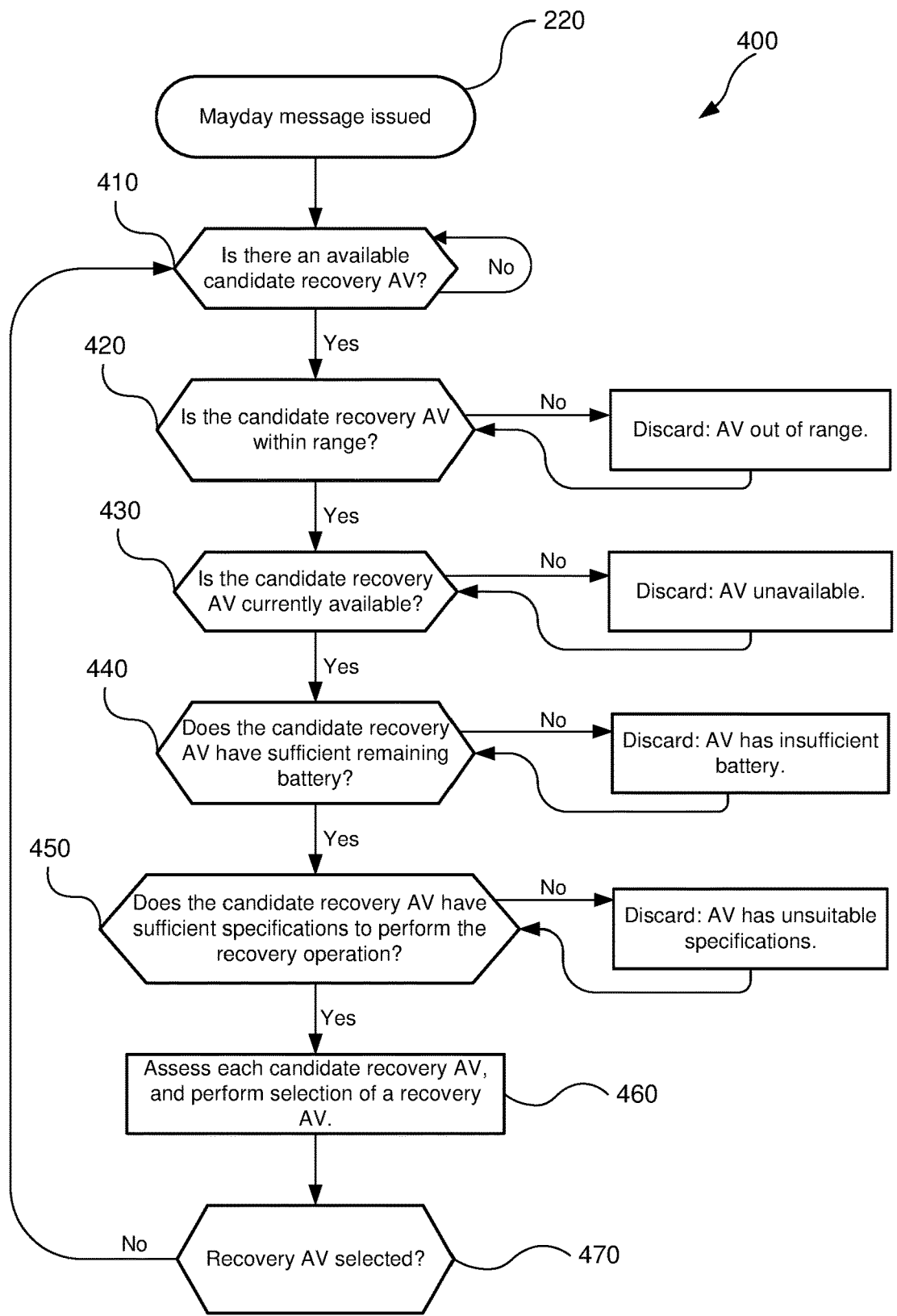
FIG. 5 shows a process of identifying an AV to perform the recovery operation.

FIG. 5 shows an exemplary process 400 for identifying a recovery AV.

In a first step 220, a mayday message is issued (as described above). An assessment is then made as to whether there is a candidate recovery AV that is available to perform the recovery operation 410. If so, then assessments are subsequently made as to the suitability of each available candidate recovery AV to perform the recovery operation, including whether the candidate recovery AV is:

within a threshold distance of the first AV (e.g. within 10 mile) 420;
  if not, the candidate recovery AV is no longer considered for selection as a recovery AV and this step 420 repeats after a pre-defined period of time (in case the candidate recovery AV is later within range);
  if so, the process proceeds to step 430;
currently available (e.g. not itself already on a designated task) 430;
  if not, the candidate recovery AV is no longer considered for selection as a recovery AV and this step 430 repeats after a pre-defined period of time (in case the candidate recovery AV is later available);
  if so, the process proceeds to step 440;
sufficiently charged so as to be able to perform the recovery operation (e.g. at least to be able to travel to the first AV, retrieve the payload and then complete the designated task); and
  if not, the candidate recovery AV is no longer considered for selection as a recovery AV and this step 440 repeats after a pre-defined period of time (in case the candidate recovery AV has been charged up);
  if so, the process proceeds to step 450;
able to retrieve the payload to the extent that its specifications permit it to do so (e.g. it has sufficient space within its cargo bay) 450;
  if not, the candidate recovery AV is no longer considered for selection as a recovery AV and this step 440 repeats after a pre-defined period of time (e.g. in case the candidate recovery AV later frees space within its cargo bay);
  if so, the process proceed to step 460.

If the candidate recovery AV has passed all of the sequential assessments (i.e. steps 420 to 450), then it is considered—along with any other candidate recovery AVs that are, in another iteration of this process, potentially deemed to be suitable—for selection as the recovery AV.

At step 460, if there is a single suitable candidate recovery AV, then it is selected from the remaining eligible candidate AVs as the recovery AV. Where a plurality of candidate recovery AVs remain at step 460, further assessments may be made to identify a single suitable candidate recovery AV, for example based on a lowest cost function, a nearest AV or selection based on a weighting of various capabilities.

If, however, it is assessed 470 that no recovery AV is suitable for selection at step 460, the process reiterates back to step 410 after a predetermined period of time, in case more candidate recovery AVs become available in this time.

If it is identified at step 410 that no candidate recovery AV is available, then the process reiterates back to step 410 after a predetermined period of time (i.e. a delay), in case a candidate recovery AVs become available in this time.

It will be appreciated that any combination and/or sequence of assessments can be made so as to select a recovery AV based on capability.

Alternatives and Modifications

In FIG. 1, the AVs are shown as so-called drones. In another example, the AVs include autonomous or semi-autonomous vehicles of any kind, such as: ground vehicles (including hovercraft and subterranean vehicles); marine vehicles (including submarines); aerial vehicles (including space vehicles); and hybrid such vehicles.

The designated task of an AV includes: delivery of the payloads; industrial operations, such as industrial or agricultural operations, including harvesting and/or depositing resources; telecommunications operations, including operating as a mobile remote access point and/or a repeater for a telecommunications network; construction or repair operations; and/or surveillance, rescue or reconnaissance operations. Accordingly, the AVs extend to any such vehicle capable of performing such operations.

In one example, the recovery operation is, or includes, retrieval of the first AV 110-1. Furthermore, the recovery operation includes delivery of the first AV 110-1 to a destination and/or disposal/destruction of the first AV.

In one alternative, if no single recovery AV is identified (after having attempted to do so after a predetermined length of time), then a plurality of AVs are selected together to act as recovery AVs—either at the same time (e.g. where no individual AV is capable of carrying the mass of the payload) or in sequence (e.g. where no individual AV has sufficient battery to complete the designated task).

Whilst the process of identifying and/or selecting a recovery AV is described above as being performed by the network core 125, this is, in one alternative, performed elsewhere within the telecommunications network 140 (or by another telecommunications network entirely), and in particular at a network edge, such as by a RAN access point 150.

As previously described, the step of identifying the recovery AV is performed by the AVMS 195. However, in an alternative, the step of identifying the recovery AV is performed, at least in part, by:
  the first AV 110-1, in which case, for example:
    the AVMS 195 responds to the mayday message with a list of candidate recovery AVs, including capability information regarding the candidate recovery AVs, and the first AV itself subsequently identifies the recovery AV;
      The identified recovery AV is available to be instructed by the telecommunications network, in which case the first AV communicates the identity of the identified recovery AV to the telecommunications network or the first AV is available directly to instruct the identified recovery AV, for example by issuing a device-to-device communication to the identified recovery AV.
  an AV that is not a candidate recovery AV, but is instead another first AV that has already selected a recovery AV (e.g. an issuing AV, as described above);
    this may increase (processing and signalling) efficiency since the AV that has already selected a recovery AV may have already performed processing that facilitates identification of the recovery AV for the first AV;
  a candidate recovery AV; or
    for example, once candidate recovery AVs have received the interrogation message 310, each candidate recovery AV assesses its own capabilities to complete the recovery operation, and the first to do so transmits an acceptance message 340, which identifies it as the recovery AV and alerts the remaining candidate AVs; or
    for example, once candidate recovery AVs have received the interrogation message 310, each candidate recovery AV sends its capability information to a designated central candidate recovery AV for it to identify the recovery AV and then to communicate the identity of the recovery AV either to the telecommunications network (which then instructs the identified recovery AV) or directly to instruct the identified recovery AV;
  an AV management centre that is remote (in a network sense) to the telecommunications network 140, which then communicates the identity of the recovery AV to the AVMS thereby then to instruct the identified recovery AV.

With reference to FIG. 4, communications 310, 320, 330, 340 and 350 are alternatively available to be communicated as any form of wireless network communication.

Reference is made throughout to an Autonomous Vehicle (AV), however, in one alternative the mayday message is generated by any device that comprises functionality to determine the presence of a fault associated with the device and to communicate with a wireless telecommunications network so as to trigger a recovery operation. In such examples, there may or may not be a designated task, and a designated task may be generated as part of the recovery operation. For example, the device is a network-enabled automobile or wearable device, and the mayday message is generated in response to detecting a collision (e.g. upon triggering an airbag) or a fall, which in turn triggers a recovery operation in the form of a dispatch of emergency services (e.g. fire brigade, police and/or ambulance), and a designated task is only then generated (e.g. to transport passengers to a hospital and to transport the automobile to a workshop).

In yet another example, the mayday message is in the form of a so-called "last gasp" communication; this is particularly appropriate where there is failure of, at least, communication equipment of the faulty AV (e.g. due to insufficient battery power). Accordingly, the "last gasp" mayday message is configured to provide sufficient information to identify an appropriate recovery AV and then for the recovery AV to perform the recovery operation without further communication with the faulty AV.

In one example, the cargo bay of a faulty AV is a secured cargo bay, so as to prevent unauthorised access and retrieval of the payload. Accordingly, in order for a recovery AV to salvage the payload from the secure cargo bay, the recovery AV communicates with the faulty AV (when sufficiently proximate to one another) to authenticate itself to the first AV and indicate that it is authorised to salvage the payload. Upon receipt of a valid authentication, the faulty AV unlocks its cargo bay. It will be appreciated that this feature is most appropriate when the faulty AV is still capable of locking and unlocking its cargo bay and communicating with a recovery AV (e.g. when the faulty AV has sufficient battery). If the faulty AV is not, or does not expect to be, able to unlock its cargo bay only upon authentication of a proximate recovery AV (e.g. when it issues a mayday message as a "last gasp" communication), then the faulty AV unlocks its cargo bay by default (which may increase the risk of successful scavenging of the payload, but may also assist the recovery operation), or the recovery AV recovers the faulty AV or its cargo bay as a whole.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of operating a device, the device being configured to communicate with a wireless telecommunications network and the device being in the form of an Autonomous Vehicle (AV), the method comprising the steps of:
   detecting a fault associated with the AV; and
   in response to detecting said fault, causing the AV to transmit a mayday wireless network communication for alerting the wireless telecommunications network of the fault;
   in response to the mayday wireless network communication, identifying a recovery AV that is capable of retrieving at least part of the AV and delivering said at least part to an intended destination; and
   instructing the recovery AV to perform the retrieving and delivering by communicating an instructing message, wherein the instructing message is in the form of a system information message.

2. A method according to claim 1, further comprising the steps of the wireless telecommunications network:
   in response to the mayday wireless network communication, transmitting a recovery wireless network communication for causing the recovery AV to respond to said recovery wireless network communication with capability information regarding a capability of the recovery AV to retrieve the at least part of the AV and to deliver said at least part to the intended destination, and performing said identifying of the recovery AV in dependence on said capability information.

3. A method according to claim 1, wherein the recovery wireless network communication is in the form of a system information message.

4. A method according to claim 2, wherein said recovery wireless network communication is communicated by a radio access network access point of the wireless telecommunications network that received the mayday wireless network communication.

5. A method according to claim 1, wherein the instructing message is communicated by the, or another, wireless telecommunications network, and wherein the recovery AV is not a subscriber of the or the other wireless telecommunications network.

6. A method according to claim 1, further comprising the step of identifying the recovery AV in dependence on an identified location of the recovery AV and/or the AV.

7. A method according to claim 6, further comprising the step of communicating the instructing message by means of at least one radio access point, and wherein said at least one radio access point is selected in dependence on the identified location of the recovery AV.

8. A method according to claim 1, wherein the instructing message is communicated by a radio access point of the, or another, wireless telecommunications network, wherein said radio access point first received the mayday wireless network communication and/or is a closest radio access point to the AV.

9. A method according to claim 1, wherein the instructing message is communicated by at least one radio access point of the, and/or another, wireless telecommunications network, said at least one radio access point being adjacent to a radio access point that first received the mayday wireless network communication.

10. A method according to claim 1, wherein the fault is detected in response to receiving a network communication for reporting a fault.

11. A method according to claim 1, wherein the mayday wireless network communication and/or the instructing message comprises information regarding the at least part of the AV that is to be retrieved and delivered.

12. A method according to claim 1, wherein the AV ceases travel in response to detecting the fault.

13. A method according to claim 1, wherein the AV is carrying one or more payload/s to one or more intended destination/s, and wherein a plurality of recovery AVs are identified and instructed to retrieve and to deliver the one or more payload/s to the one or more intended destination/s.

14. A method according to claim 1, wherein the AV is an aerial, marine and/or ground vehicle.

15. A method according to claim 1, wherein at least a part of the system information message is encrypted.

16. A system for managing Autonomous Vehicles (AVs), comprising:
   an AV;
   a recovery AV; and
   a wireless telecommunications network, comprising:
   a transceiver for communicating an instructing message to the recovery AV, wherein said instructing message is configured to cause the recovery AV to perform retrieval and delivery of the, or a part of the, AV, wherein the instructing message is in the form of a system information message.

* * * * *